United States Patent [19]
Bakhshi et al.

[11] Patent Number: 5,614,132
[45] Date of Patent: *Mar. 25, 1997

[54] METHOD FOR MANUFACTURING A MINERAL FIBER PRODUCT

[75] Inventors: Shiv K. Bakhshi, Columbus; Steven H. Williams, Alexandria; James W. Scott, Newark; Randall M. Haines, Frazeysburg, all of Ohio

[73] Assignee: Owens Corning Fiberglas Technology, Inc., Summit, Ill.

[ * ] Notice: The term of this patent shall not extend beyond the expiration date of Pat. No. 5,458,822.

[21] Appl. No.: 473,600

[22] Filed: Jun. 7, 1995

Related U.S. Application Data

[63] Continuation of Ser. No. 78,909, Jun. 21, 1993, Pat. No. 5,458,822.

[51] Int. Cl.$^6$ .............................. C03B 37/04; D01D 5/00
[52] U.S. Cl. .................. 264/6; 65/455; 65/460; 264/8; 264/103; 264/115; 264/121; 264/122; 264/211.1; 264/211.11
[58] Field of Search .................................. 264/6, 8, 103, 264/115, 121, 122, 211.1, 211.11, 518; 65/455, 460

[56] References Cited

U.S. PATENT DOCUMENTS

| | | |
|---|---|---|
| 2,278,895 | 4/1942 | Rugeley . |
| 2,399,260 | 4/1946 | Taylor . |
| 2,433,000 | 12/1947 | Manning . |
| 2,731,066 | 1/1956 | Hogendobler . |
| 2,778,763 | 1/1957 | Novak . |
| 2,944,284 | 7/1960 | Tillotson . |
| 3,012,281 | 12/1961 | Stalego . |
| 3,016,599 | 1/1962 | Perry, Jr. . |
| 3,022,538 | 2/1962 | Setterberg . |
| 3,025,202 | 3/1962 | Morgan . |
| 3,050,427 | 8/1962 | Slayter . |
| 3,077,751 | 2/1963 | Snow . |
| 3,134,704 | 5/1964 | Modigliani . |
| 3,264,389 | 8/1966 | Sims . |
| 3,511,747 | 5/1970 | Davies . |
| 3,684,415 | 8/1972 | Buntin et al. . |
| 3,725,518 | 4/1973 | Gaffney . |
| 3,765,998 | 10/1973 | Oswald et al. . |
| 3,862,287 | 1/1975 | Davis . |
| 3,877,911 | 4/1975 | Borst . |
| 4,147,574 | 4/1979 | Setsuie et al. . |
| 4,197,063 | 4/1980 | Davidson . |
| 4,224,373 | 9/1980 | Marzocchi . |
| 4,277,436 | 7/1981 | Shah et al. . |
| 4,359,444 | 11/1982 | Shah et al. . |
| 4,414,276 | 11/1983 | Kirivaba et al. . |
| 4,552,603 | 11/1985 | Harris, Jr. et al. . |
| 4,568,506 | 2/1986 | Kiriyama et al. . |
| 4,871,491 | 10/1989 | McMahon et al. . |
| 5,011,523 | 4/1991 | Roncato et al. . |
| 5,057,168 | 10/1991 | Muncriet . |
| 5,100,435 | 3/1992 | Onwumere . |
| 5,100,592 | 3/1992 | Sparks . |
| 5,123,949 | 6/1992 | Thiessen .............................. 65/460 X |
| 5,232,638 | 8/1993 | Thiessen et al. ............................. 264/6 |

FOREIGN PATENT DOCUMENTS

| | | |
|---|---|---|
| 0371613 | 6/1990 | European Pat. Off. . |
| 0530843 | 3/1993 | European Pat. Off. . |
| 0329118 | 8/1993 | European Pat. Off. . |

*Primary Examiner*—Leo B. Tentoni
*Attorney, Agent, or Firm*—C. Michael Gegenheimer; Curtis B. Brueske

[57] ABSTRACT

A method for manufacturing a mineral fiber product includes centrifuging mineral fibers with a spinner, forming a veil of the mineral fibers moving in the direction of the axis of the spinner, directing toward the veil, from a position within the veil, organic material to cause intermingling of the organic material and the mineral fibers, and, collecting the intermingled organic material and mineral fibers to form a mineral fiber product.

27 Claims, 2 Drawing Sheets

METHOD FOR MANUFACTURING A MINERAL FIBER PRODUCT

This is a continuation application of U.S. patent application Ser. No. 08/078,909, filed Jun. 21, 1993, now U.S. Pat. No. 5,458,822, issued Oct. 17, 1995.

TECHNICAL FIELD

This invention relates to the production of mineral fiber products and, in particular, mineral fiber products having an organic or polymer applied thereto. More particularly, this invention relates to making a mineral fiber product with a novel way of applying polymeric material to the mineral fibers.

BACKGROUND OF THE INVENTION

Mineral fiber products, particularly products made of glass fibers, are typically made as either continuous fibers or discontinuous fibers. Various organic coatings are applied to these fibers for protecting the fibers from abrasion, for connecting the mineral fibers to each other to form a structural product, and for providing compatibility of the mineral fibers with other materials, such as the compatibility between the reinforcement fiber and a plastic matrix. In the case of insulation products, the mineral fibers are bonded together by organic material, such as a phenol/formaldehyde binder, to form a spring-like matrix which can recover after compression during packaging.

The application of organic material to the mineral fibers can take several forms. Continuous mineral fibers can be run through a bath or across a coater to apply a coating to the fibers, such as during the application of a size to continuous fibers. Also, the organic material can be sprayed onto the mineral fibers. This method is commonly used in the manufacture of insulation products where a cylindrical veil of mineral fibers is met with the sprays of the phenol/formaldehyde binder. Typically, the phenol/formaldehyde binder contains urea, and has a molecular weight of around 600 in the uncured state in the aqueous solution being applied to the glass fibers.

One of the problems with applying aqueous organic binders of the prior art to cylindrical veils of mineral fibers is that a portion of the binder tends to evaporate prior to contact between the liquid binder drop and a mineral fiber in the veil. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect.

Another problem associated with the application of binder to insulation products is that the low molecular weight phenol/formaldehyde binder material does not have some of the desirable characteristics of other, higher molecular weight polymeric material, such as polyethylene terephthalate (PET), polypropylene or polyphenylene sulfide (PPS). A primary problem with the low molecular weight binder material is that a curing process is required, and this usually has operating penalties such as the capital and operating cost of a curing oven, the cost of handling pollution problems, degree of cure problems and product integrity problems. If higher molecular weight polymers could be applied to mineral fibers to produce insulation products, some improved features could be realized.

Heretofore, attempts to apply higher molecular weight binders to mineral fibers to produce an insulation product have not met with great success. One of the problems with the attempts to apply higher molecular weight polymers, as well as the lower molecular weight phenol/formaldehyde binders to veils of glass fibers, has been that the application of the material is very uneven, resulting in differences in the amount of the binder material applied to different portions of the insulation product. It would be advantageous to be able to apply these binder materials in a more uniform manner to produce a more uniformly distributed bindered product.

SUMMARY OF THE INVENTION

There is now been developed a method for manufacturing a mineral fiber product which includes the step of directing polymeric material from within a cylindrical veil of mineral fibers into entanglement with the mineral fibers in order to produce an improved mineral fiber product. By directing the binder material from a position within the veil, the material is able to achieve a much more uniform intermingling with the mineral fibers in order to provide a unique uniformly bindered product. The method of the invention enables the application of binder materials having molecular weight in excess of 1,000, preferably in excess of 10,000, and most preferably in excess of 100,000.

According to this invention there is provided a method for manufacturing a mineral fiber product comprising centrifuging mineral fibers with a spinner, forming a veil of the mineral fibers moving in the direction of the axis of the spinner, directing toward the veil, from a position within the veil, polymeric material having a molecular weight greater than 1,000 to cause intermingling of the polymeric material and the mineral fibers, and collecting the intermingled polymeric material and mineral fibers to form a mineral fiber product. It has been found that the product made by the method of this invention produces an insulation product having a greater degree of flexibility and handleability than typical insulation products. Further, the product produced by the invention exhibits improved recovery over standard insulation products.

In a specific embodiment of the invention, the directing step comprises centrifuging the polymeric material with a second spinner. The second spinner can form polymeric fibers, which are directed toward the veil. Alternatively, the second spinner can direct the polymeric material toward the mineral fibers in a non-fibrous form.

In a specific embodiment of the invention, the polymeric material, whether fibers or particles, is directed into engagement with the mineral fibers in a heated zone so that the polymeric materials or polymeric fibers are in a softened condition as they intermingle with the mineral fibers of the veil. In yet another specific embodiment of the invention, the polymeric material is directed toward the veil in the form of a film.

In one novel aspect of the invention, a first polymeric material is centrifuged to form a veil of first polymer fibers, and a second polymeric material having a molecular weight greater than 1000 is directed toward the veil from a position within the veil to intermingle with the first polymer fibers. The resulting product includes the first polymer fibers and the intermingled second polymer material.

In the specific embodiment of the invention, the first polymeric material is polyphenylene sulfide (PPS) and the second polymeric material is PET.

DESCRIPTION OF THE INVENTION

The invention will be described in terms of a glass fiber forming operation, although it is to be understood that the invention can be practiced using other heat softenable mineral material, such as rock, slag, and basalt.

Figure 1:
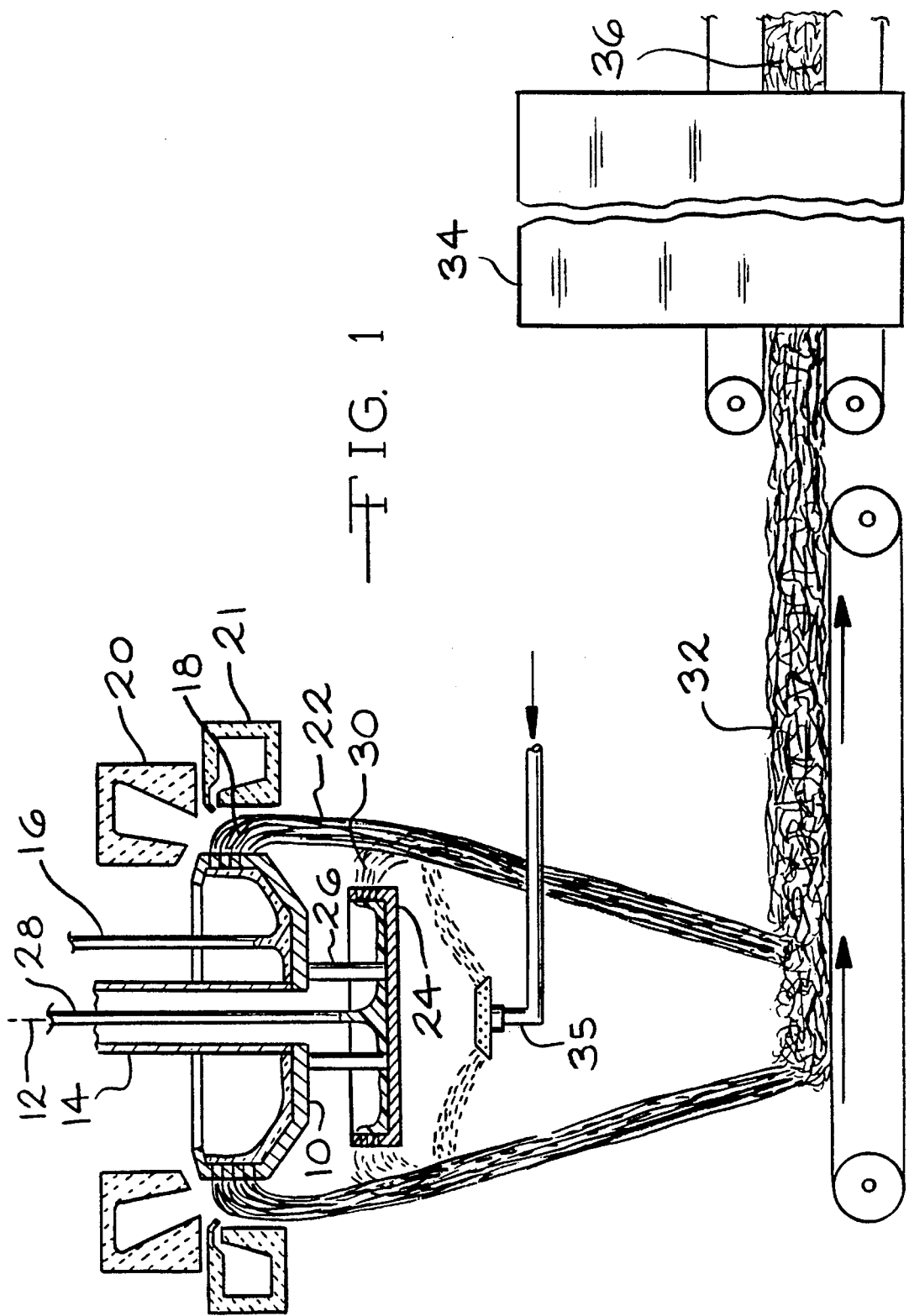
FIG. 1 is a schematic view in elevation of apparatus for carrying out the method of the invention as applied to the centrifical fiberization of glass fibers.

As shown in FIG. 1, glass spinner 10 rotates on axis of rotation 12 and is driven by shaft 14. The spinner is supplied by molten stream of glass 16 which is centrifuged through the walls of the spinner of form glass fibers 18. The glass fibers are maintained in a soft, attenuable state immediately outside the spinner by the heat from annular burner 20. The radially-traveling glass fibers are turned down by blower 21 into a cylindrically shaped veil 22 of fibers, traveling downwardly, i.e., in the direction of the axis of the spinner. The process for creating the downwardly moving veil of glass fibers is well known in the art.

Positioned beneath the glass spinner is a rotatable device for distributing polymeric material into contact with the veil from a position within the veil. The embodiment shown in FIG. 1 includes the use of a second spinner, polymer spinner 24, for distributing polymeric material into contact with the veil. The polymer spinner can be mounted for rotation in any form. As shown, it can be mounted with supports 26 into direct contact with the glass spinner for rotation.

The polymer spinner is supplied with stream 28 of molten polymer material. As shown, this stream can be fed through the hollow portion of the glass spinner shaft. The molten polymer can be produced or supplied by using extruder equipment commonly known to those in the art of polymeric materials, such as PET.

Depending on the viscosities, surface tension and other parameters of the polymeric material, and on the rotation rate and orifices of the polymer spinner, polymer fibers 30 may be produced from the polymer spinner. The polymer fibers travel radially outwardly where they meet and intermingle with the mineral fibers.

Since the glass fibers and glass spinners operate at a temperature of around 1,700° F., the polymer fibers are rapidly thrust into a region of high temperature, causing the polymer fibers to soften. It has been found that some of polymer fibers melt, forming droplets or other particles which attach themselves to some of the mineral fibers. Others of the polymer fibers retain their fibrous shape, resulting in the presence of polymer fibers in the mineral fiber pack 32. The reason that some of polymeric material retains its fibrous shape, while other portions of the material form polymeric particles which attach themselves to the mineral fibers is not known. It may be that some of the polymer fibers do not soften to the extent required to cause them to lose their fibrous shape and turn into a more spherical shape. Alternatively, it may be that although all polymer fibers are softened, only a portion of them come into contact with mineral fibers while in a softened condition.

In order to make sure that the polymeric material does not experience a temperature exceeding the degradation or oxidation limit, a cooling means, such as water distributor 35 can be used to control the temperature regime which is experienced by the polymer fibers or polymeric material. The water distributor can be any suitable means for supplying finally divided moisture into the vicinity of the traveling polymer material. Another example of a cooling means is an air flow device which directs air toward the polymer particles or fibers to control temperature at the point where the polymeric material meets the fibers.

After the intermingled polymeric material and mineral fibers are collected to form a pack, optionally the pack can be passed through oven 34 to reset the form of the mineral fiber pack in order to produce mineral fiber product 36.

One of the advantages of the invention is that it enables the application of high molecular weight thermoplastic binders. Heretofore, these binders have not been able to be successfully applied from outside the veil because of temperature restrictions.

Figure 2:
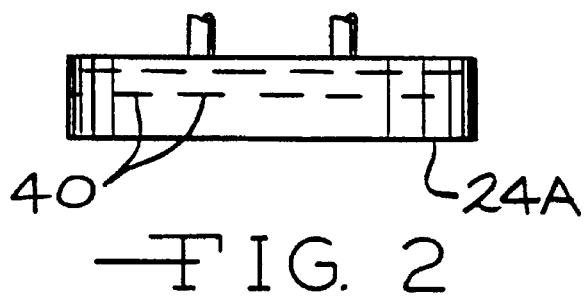
FIG. 2 is a schematic view in elevation of an alternate embodiment of a polymer spinner used in the invention.

It is not necessary for the polymeric material to be supplied in fibrous form for entanglement with the mineral fibers. The polymeric material can be supplied in droplet or ribbon form such as produced by polymer spinner 24A having slit orifices 40, shown in FIG. 2.

Figure 3:
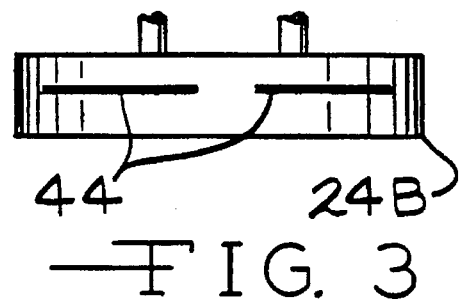
FIG. 3 is a schematic view in elevation of yet another embodiment of a polymer spinner used in the invention.

As shown in FIG. 3, polymer spinner 24B can be adapted with slot orifices 44 to produce radially traveling film of polymeric material which engages the mineral fibers to form mineral fibers with polymeric material attached thereto.

It should be understood that other high molecular weight polymeric material can be used in this invention. Examples include polycarbonate material, polypropylene, polystyrene, and polysulfide.

It should also be understood that various amounts of polymeric material and mineral fiber material can be provided in the ultimate mineral fiber product. For example, typical building insulation has about 5% by weight of phenol/formaldehyde, and the insulation product resulting from this invention could have a similar weight ratio of polymeric material to the weight of the mineral fiber product. Insulation molding media products could have polymeric material within the range of from about 10 to about 30% by weight of the mineral fiber product. Other mineral fiber products could include amounts of polymeric material exceeding 50% by weight of the mineral fiber product and possibly even exceeding 70 percent.

EXAMPLE

The method of the invention was employed to make a PET/glass fiber product. The glass fiber spinner had 50,000 orifices and was operated at a throughput of approximately 1,100 lbs. per hour. The PET material was supplied to a polymer spinner mounted for rotation beneath the glass spinner. The polymer spinner had approximately 7,000 orifices, and a throughput of approximately 50 lbs. per hour. The PET material had a molecular weight in excess of 200,000. The spinners were maintained at different temperatures to successfully process the glass and the polymer material, respectively.

The resulting product was a uniform blend of glass and polymer fibers, with some of the polymeric material being attached to the glass fibers, and some of the polymeric material being retained as intermingled polymer fibers. The product from this trial was found to be more flexible and more resistant to breaking under deflection than traditional glass fiber wool molding media. When molded in a typical glass fiber wool molding media apparatus, the product of the invention gave superior results, primarily in terms of resistance to breaking under deflection. This benefit was evident when molded both as produced, and when post-treated with a resin such as a phenol/formaldehyde. Prior to molding, the product also exhibited increased recovery characteristics over that of the standard phenol/formaldehyde products. Also, application of ultra-violet light to the product gave a clear indication that the PET/glass fiber product had a greater uniformity of binder distribution than exhibited in typical phenol/formaldehyde products.

Figure 4:
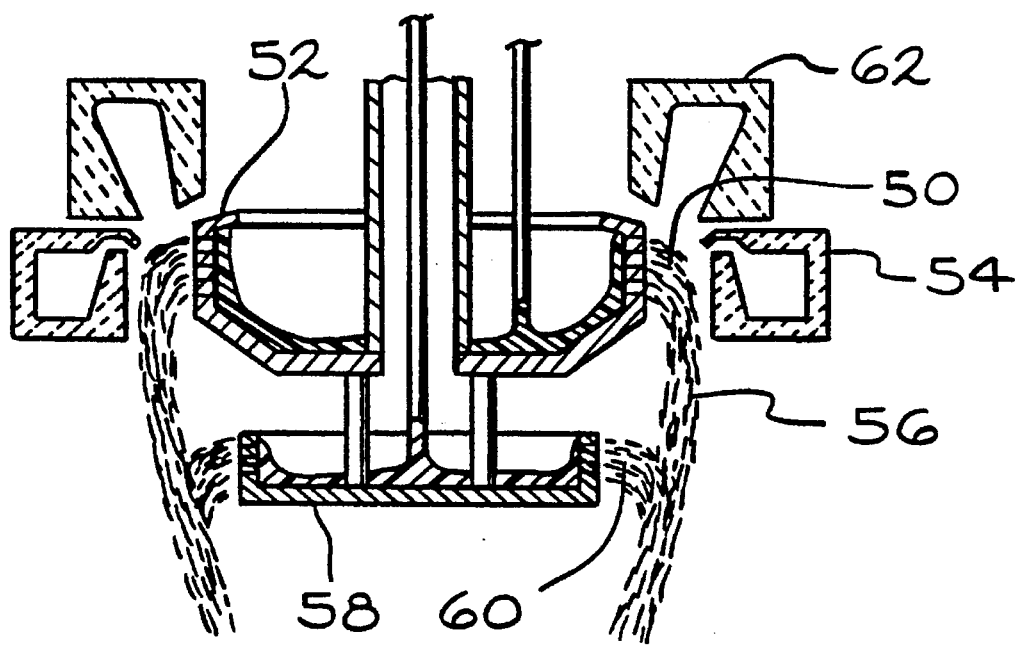
FIG. 4 is a schematic view in elevation of another embodiment of the invention in which a first polymer is centrifuged from a first polymer spinner and the second polymeric material is centrifuged from within the veil of the first polymer fibers.

The method of the invention can be used to produce a fibrous product made from two different polymeric materials. Preferably, the two polymeric materials are intermingled through a co-fiberizing process using coaxial centrifuges or spinners. As shown in FIG. 4, first polymeric fibers 50 can be centrifuged from first polymeric spinner 52 and turned downward by any suitable means, such as annular blower 54 to form veil 56 of the first polymeric fibers. Positioned within the veil is second polymer spinner 58 for distributing second polymer fibers 60 into the veil. It is to be understood that any means for distributing the second polymeric material into engagement with the veil of the first polymer fibers can be used. Preferably, the second polymeric material is fiberized and directed toward the veil of first polymer material as polymer fibers. It may be advantageous to provide heat into the fiberizing process, either for the first polymer fibers or for the second polymer material. This can be provided by any suitable means, such as annular burner 62.

A preferred fibrous product produced by this embodiment of the invention would include first polymer fibers made from polyphenylene sulfide (PPS) and an intermingled amount of PET material. Most preferably, the PPS fibers would be thicker than the PET fibers for greater loft of the fibrous product. The PET fibers would provide strength to the fibrous product. It is to be understood that the PET material could be applied in such a manner that some of it would melt and form PET particulate matter on the PPS fibers.

It will be evident from the foregoing that various modifications can be made to this invention. Such, however, are considered as being within the scope of the invention.

INDUSTRIAL APPLICABILITY

This invention will be found useful in the production of mineral fiber products, such as glass fiber products, for such uses as thermal insulation and glass fiber structural products. High performance polymer fibers such as PPS can be substituted for the mineral fibers to make an all-polymer product.

What is claimed is:
1. The method for manufacturing a mineral fiber product comprising:
   a. centrifuging mineral fibers with a first spinner;
   b. forming a veil of the mineral fibers moving in the direction of the axis of the first spinner;
   c. forming and directing toward the veil, from a position within and spaced from the veil, organic material in the form of fibers to cause intermingling of the organic material and the mineral fibers; and,
   d. collecting the intermingled organic material and mineral fibers to form a mineral fiber product.
2. The method of claim 1 in which the forming and directing step comprises centrifuging the organic material with a second spinner.
3. The method of claim 1 comprising heating at least a portion of the organic fibers so that they are in a softened condition as they intermingle with the veil.
4. The method of claim 1 in which the molecular weight of the organic material is greater than 1,000.
5. The method of claim 1 in which the molecular weight of the organic material is greater than 10,000.
6. The method of claim 1 in which the organic material comprises at least 50 percent by weight of the mineral fiber product.
7. The method for manufacturing a mineral fiber product comprising:
   a. centrifuging mineral fibers with a first spinner;
   b. forming a veil of the mineral fibers moving in the direction of the axis of the first spinner;
   c. centrifuging organic material with a second spinner positioned within the veil to form organic fibers, and directing the organic fibers toward the veil, from a position within and spaced from the veil, to cause intermingling of the organic material and the mineral fibers, where at least a portion of the organic fibers become heated so that they are in a softened condition as they intermingle with the veil; and,
   d. collecting the intermingled organic material and mineral fibers to form a mineral fiber product.
8. The method of claim 7 in which the molecular weight of the organic material is greater than 1,000.
9. The method of claim 7 in which the molecular weight of the organic material is greater than 10,000.
10. The method for manufacturing a fibrous product comprising:
    a. centrifuging organic fibers from a first organic material with a first spinner;
    b. forming a veil of the first organic fibers moving in the direction of the axis of the first spinner;
    c. directing toward the veil, from a position within and spaced from the veil, a second organic material to cause intermingling of the second organic material and the first organic fibers; and,
    d. collecting the intermingled second organic material and first organic fibers to form a fibrous product.
11. The method of claim 10 in which the directing step comprises centrifuging the second organic material with a second spinner.
12. The method of claim 10 in which the directing step comprises forming second organic fibers from the second organic material and directing the second organic fibers toward the veil.
13. The method of claim 12 comprising heating at least a portion of the second organic fibers so that they are in a softened condition as they intermingle with the veil.
14. The method of claim 10 in which the second organic material is directed as a film toward the veil.
15. The method of claims 12, 13 or 14 in which the molecular weight of the second organic material is greater than about 10,000.
16. The method of claim 10 in which the molecular weight of the second organic material is greater than 100,000.
17. The method of claim 10 in which the first organic material is PPS and the second organic material is PET.

18. The method of claim 7 in which the organic material comprises at least 50 percent by weight of the mineral fiber product.

19. The method of claim 10 in which the first organic material is a polymer material, and the directing step comprises centrifuging the second organic material as fibers with a second spinner.

20. The method of claim 10 comprising heating at least a portion of the second organic fibers so that they are in a softened condition as they intermingle with the veil.

21. The method of claim 19 in which the molecular weight of the second organic material is greater than about 10,000.

22. The method for manufacturing a mineral fiber product comprising:

a. centrifuging mineral fibers with a first spinner;

b. forming a veil of the mineral fibers moving in the direction of the axis of the first spinner;

c. forming and directing toward the veil, from a position within and spaced from the veil, organic material in the form of a film to cause intermingling of the organic material and the mineral fibers; and, d. collecting the intermingled organic material and mineral fibers to form a mineral fiber product.

23. The method of claim 22 in which the forming and directing step comprises centrifuging the organic material with a second spinner.

24. The method of claim 22 comprising heating at least a portion of the organic material so that it is in a softened condition as it intermingles with the veil.

25. The method of claim 22 in which the molecule weight of the organic material is greater than 1,000.

26. The method of claim 22 in which the organic material is a polymer material.

27. The method of claim 22 in which the organic material comprises at least 50 percent by weight of the mineral fiber product.

* * * * *

UNITED STATES PATENT AND TRADEMARK OFFICE
CERTIFICATE OF CORRECTION

PATENT NO. : 5,614,132

DATED : June 7, 1995

INVENTOR(S): Shiv K. Bakhshi et al.

It is certified that error appears in the above-identified patent and that said Letters Patent is hereby corrected as shown below:

In Claim 25, Line 1, "molecule" should be --molecular--.

Signed and Sealed this

Twenty-fourth Day of June, 1997

*Attest:*

BRUCE LEHMAN

*Attesting Officer*  Commissioner of Patents and Trademarks